[11] 3,627,858

[72] Inventors  Leo P. Parts
 Dayton, Ohio;
 Jules Pinsky, West Hartford, Conn.; Edgar E. Hardy, Kettering, Ohio
[21] Appl. No. 879,485
[22] Filed Nov. 24, 1969
[45] Patented Dec. 14, 1971
[73] Assignee Monsanto Research Corporation
 St. Louis, Mo.

[54] METHOD FOR SELECTIVELY FOAMING THE SURFACE OF A THERMOPLASTIC ARTICLE BY USE OF A LASER
 3 Claims, 4 Drawing Figs.
[52] U.S. Cl. .................................................. 264/25,
 35/35 A, 40/324, 161/7, 161/160, 161/413, 219/121, 264/45, 264/53
[51] Int. Cl. .................................................. B29d 27/00,
 H05b 7/00, H01s 3/00
[50] Field of Search ............................................. 264/51, 53, 45, 25; 331/94.5; 40/324; 35/35 A; 161/7, 160, 413; 219/121 EM, 121 LM

[56] References Cited
UNITED STATES PATENTS

| | | | |
|---|---|---|---|
| 3,262,625 | 7/1966 | Russell .......................... | 264/53 X |
| 3,300,553 | 1/1967 | Shelby .......................... | 264/53 X |
| 3,389,199 | 6/1968 | Bushnell Jr. .................. | 264/45 X |

OTHER REFERENCES
Practical Vocb of Lasert by W. T. Gunston, Science Journal (Great Britain) June 1966. (2 copsic supplied ROS)

*Primary Examiner*—Julius Frome
*Assistant Examiner*—James B. Lowe
*Attorneys*—Morris L. Nielsen and L. Bruce Stevens, Jr.

ABSTRACT: A method for foaming a design on the surface of a thermoplastic article, using laser radiation to produce an embossed surface with sharp definition.

PATENTED DEC 14 1971

3,627,858

INVENTORS.
LEO P. PARTS
JULES PINSKY
EDGAR E. HARDY

BY Morris L. Nielsen
ATTORNEY.

METHOD FOR SELECTIVELY FOAMING THE SURFACE OF A THERMOPLASTIC ARTICLE BY USE OF A LASER

BACKGROUND OF THE INVENTION

1. Field of the Invention

This invention relates to a method of producing a foamed design on a thermoplastic article by expanding a blowing agent absorbed by the plastic. More particularly, the invention relates to a method of quickly producing a foamed design having sharp definition on a thermoplastic article by steeping the article in the blowing agent or medium until it is absorbed by the plastic, removing the article from the medium, and subjecting the article to the radiation from a laser projected in a pattern on the plastic article.

2. Description of the Prior Art

It is well-known in the art that plastic foams may be produced by incorporating a blowing agent in a thermoplastic material and then raising the temperature of the thermoplastic material to expand the blowing agent, forming a cellular structure. Such foams are known to have density than the original material, and to have improved thermal insulating properties.

In addition, methods of producing plastic articles that combine the insulating characteristics of foamed plastic with the structural strengths of nonfoamed plastic have been developed. Thus, U.S. Pat. No. 3,262,625 to David A. Russell and Edgar E. Hardy teaches a method of shaping the plastic article, steeping the article in a medium absorbable by the plastic, removing the plastic article from the medium, and heating the plastic article to produce a foamed covering.

In general, the plastics used in this invention and in the prior art are substantially thermoplastic materials which may have been fabricated into various shapes, drawn to yarn, spun-bonded, or woven to fabric, and include vinyl addition polymers, as diallyl phthalate polymers, polystyrene, styrene-butadiene-acrylonitrile graft and/or mechanical polyblends, other rubber modified graft and mechanically blended styrene polymers, vinyl chloride-vinyl acetate copolymers, polyethylene, chlorosulfonated polyethylene, chlorinated polyethylene and ethylene-vinyl acetate copolymers which are graft and/or mechanically blended with polyvinyl chloride homopolymers and copolymers, polyvinyl halide homopolymers and copolymers, including interpolymers, mixtures and plasticized versions of same. Also, condensation polymers, such as polyamides, e.g., nylon, polycarbonates and polyesters, can be used in a manner taught in the invention.

The choice of the medium or blowing agent used in this invention and in the prior art will depend on the type of thermoplastic material which is to be steeped. For example, trichlorofluoromethane is not considered suitable for the acrylonitrile-butadiene-styrene copolymers, but it is considered quite suitable for polystyrene homopolymers and rubber modified interpolymers. Among other materials which find application in the present process are methylene chloride, acetone, dichloroethylene, xylene, carbon tetrachloride, methyl ethyl ketone, benzene, toluene, chloroform and the like. Among the materials that might be mixed with the above examples of blowing agents to slow the rate or absorption include methanol, ethanol, n-pentane, isopentane, hexane, diethylethene and the like.

A number of means have been employed in the prior art to heat the plastic article after it has been steeped in the absorbable medium. Such techniques as immersing the article in a hot water bath, exposing the article to infrared radiation and the like may be used to heat the plastic article to produce a foamed covering at the area heated after previous contact with the absorbable medium. Despite these and other improvements in the art, there are certain limitations to these methods for many applications because of the inability to selectively heat the plastic article in a clearly defined area to produce an embossed design of desired configuration on the surface. Further, the heating methods taught in the prior art are relatively slow and/or do not lend themselves well to production operations.

The use of lasers as a source of heat for specific applications is also well known. Generally, lasers are classified by their type of excitation. As an example, a solid state laser, such as a ruby laser, consists essentially of a rod of the material with parallel ends polished and coated to reflect light, wherein the pumping radiation enter through the transparent sides. Another class of lasers, the gas-discharge lasers, use nonequilibrium processes in a gas discharge. The gas is excited by direct or alternating electric current, or by a radio frequency energy source. For some lasers such as the $CO_2$ laser, a continuous emission may be obtained. Still another type of laser is the semiconductor laser, such as the gallium arsenide laser, which depends on the recombination of stimulated electrons with holes in the valence band. Through recombination, energy nearly corresponding to the band gap is emitted. Many solids, glasses, liquids and gaseous systems have been used to produce laser action. Also, since the laser produces a collimated beam that can be focused by a lens or deflected by a mirror, the energy flux density and direction of a laser beam can be readily controlled. Furthermore, the beam can be shaped by using stencils into which the desired patterns have been cut.

SUMMARY OF THE INVENTION

The improvement of the present invention over older methods of foaming the surfaces of thermoplastic materials lies in the use of lasers controlled as directional energy sources. Furthermore, lasers offer advantages, particularly for production operations, over the conventional methods because of the (1) convenience in startup and shutdown without significant time lag, (2) rapid response and sensitive control of power output by simple optical or electrical means, and (3) convenient and efficient optical manipulation inherent in utilizing a collimated beam of coherent radiation for heating.

Thus, an embossed design having sharpness of definition can now be foamed on the surface of a thermoplastic article by production techniques using a straightforward and relatively inexpensive process hitherto unappreciated or considered.

Accordingly, one object of this invention is to produce embossed foam on the surface of thermoplastic parts.

Another object of this invention is to produce foam designs having sharpness of definition on the surface of thermoplastic parts.

Still another object of this invention is to produce foam designs by rapid heating for production purposes.

Yet another object of this invention is to produce foam designs on the surface of thermoplastic parts by using radiation from a laser.

These and other objects are attained in a method for producing a foamed surface on a thermoplastic article including the steps of steeping the article in a medium absorbable by the thermoplastic until the medium is partly absorbed in the thermoplastic, removing the article from the medium, and heating the steeped surface, the improvement in heating which comprises projecting the radiation from a laser onto the steeped surface of the thermoplastic article in a predetermined pattern.

DESCRIPTION OF THE PREFERRED EMBODIMENTS

Figure 1:
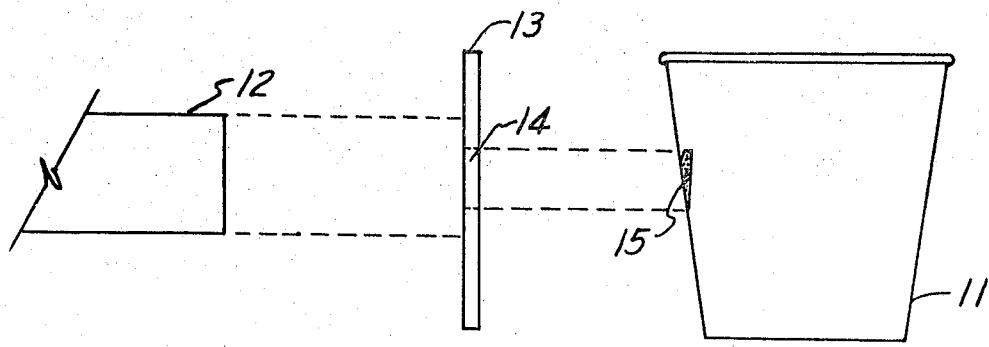
FIG. 1 is a diagrammatical view illustrating the operational steps for producing embossed foam designs on thermoplastic materials.

Referring now to FIG. 1 a thermoplastic article 11 which had been immersed for a predetermined period of time in a medium or blowing agent absorbable by the thermoplastic article, as taught in the prior art, is withdrawn from the medium and placed before a laser 12. A mask 13 having a shaped aperture 14 may be interposed between the laser 12 and article 11 to project the radiation from laser 12 in a predetermined pattern on article 11. When the laser 12 is activated, the radiation passing through shaped aperture 14 effects heating of article 11 as it impinges upon it, which results in the formation of a foam design 15 at the area which was in contact with the medium.

Figure 2:
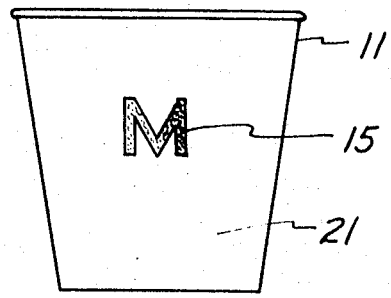
FIG. 2 is a side view of a container having an embossed foam design on its surface.

FIG. 2 illustrates one of the many products that can be formed by utilizing the process described herein. More specifically, FIG. 2 shows a thermoplastic article 11 having a design 15 foamed on the outer surface. The remainder 21 of the thermoplastic article is solid or in a nonfoamed state.

Figure 3:
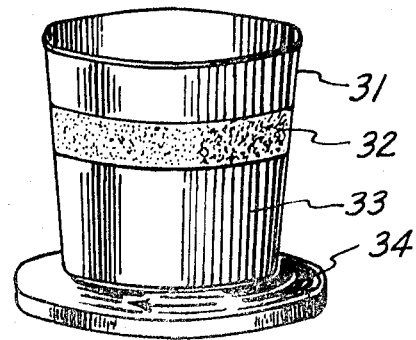
FIG. 3 is a side view of a container on a turntable, said container having an embossed foam design around its circumference.

FIG. 3 illustrates one of the many means that might be used to foam an embossed design on the surface of a thermoplastic article. A drinking cup 31 molded from a thermoplastic material, which had been immersed for a predetermined period of time in a medium absorbable by the thermoplastic, is withdrawn from the medium and placed before the laser at the center of a rotating table 34. As the cup turns, the radiation from the laser passing through a shaped aperture as shown in FIG. 1 effects heating as it impinges on cup 31, which results in the formation of a foam design 32. The remainder 33 of a cup is solid or in a nonfoamed state.

Figure 4:
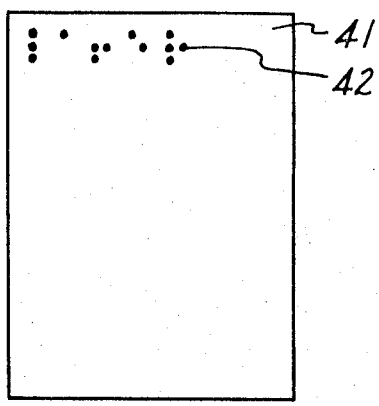
FIG. 4 is a front view of a sheet of thermoplastic material having Braille patterns embossed on the surface.

FIG. 4 illustrates a sheet of thermoplastic material 41 wherein foamed dots 42 on the outer surface form a Braille pattern and these foamed dots can be made by the method of the invention. The remainder of the sheet of plastic is solid or in a nonfoamed state.

The above description and particularly the drawings are set forth for the purpose of illustration only and not for the purpose of limitation. In a like manner the following examples are given to illustrate the invention and are not intended as limitation thereof.

EXAMPLE 1

A thin sheet of high impact polystyrene was immersed in trichloromonofluoromethane at room temperature for about 5 seconds. It was then subjected to the radiation from a $CO_2$ laser having a wavelength of 10.6 microns for about 5 seconds at an output of about 5 watts. A mask, made of a reflecting material, which was a thin copper sheet, wherein six round holes were located in such a manner to form a Braille character, was interposed in the laser beam between the laser and the plastic sheet. In the area on the plastic sheet that was irradiated the surface became raised so that the thickness of the sheet was increased approximately 100 percent. The pattern exactly corresponded to the holes in the mask, and the foamed areas were sharply set off from the plastic sheet unexposed to the laser radiation. Microscopic examination of the raised portion revealed the presence of very uniform bubbles less than 1 mm. in diameter.

When the polystyrene sheet was immersed in the trichloromonofluoromethane for only 1 or 2 seconds, only slight foaming occurred; furthermore, when the sheet was immersed for about 10 seconds, the resulting foam bubbles were not uniform in size and the foamed wall thickness was not as great.

EXAMPLE 2

A plastic drinking cup that had been molded from high-impact polystyrene was immersed for about 8 seconds in trichloromonofluoromethane at room temperature. A mask, made of a reflecting material which was a thin copper sheet which contained an aperture of a decorative pattern, was interposed between the laser and the plastic cup. An area in the wall of the cup was then exposed to the laser beam. The laser was operated at about 5 watts for 4–10 seconds, and a pattern of foamed area, exactly corresponding to the design of the aperture in the mask, was produced which had aesthetic value, as shown in FIG. 2.

From an original wall thickness of about 0.012 inch, a foamed area of uniform thickness and appearance was raised to about 0.023 inch in thickness. The foamed area, sharply set off from the unirradiated cup wall, also provided insulation between the fingers gripping the cup and any hot or cold liquid contained therein.

EXAMPLE 3

A plastic drinking cup similar to that of example 2 was surface-foamed in a circular band by immersing the cup for about 8 seconds in trichloromonofluoromethane at room temperature. The cup was set at the center of a rotating table so that the cup wall moved at a linear rate of about 50–100 mm. per minute. A mask having a 15×15 mm. square aperture was inserted between the laser and the cup. The cup was rotated while the laser irradiated the cup, thereby resulting in a circular raised band 15 mm. in width surrounding the cup as shown in FIG. 3. The band so formed pro insulation between the fingers gripping the cup and any hot or cold liquid contained within the cup.

By varying the power output of the laser from 5 to 25 watts the effective irradiation time could be varied from 20 seconds to about 4 seconds, and the time required for one revolution of the cup could be reduced proportionately.

EXAMPLE 4

A single filament of nylon having a diameter of about 0.50 mm. was immersed in 97–100 percent formic acid for about 5 seconds at room temperature. The filament was removed from the formic acid, and passed before a focused $CO_2$ laser beam at a speed of 3.9 cm./second. The average energy flux density of the 2.5 mm. laser beam impinging upon the sample was about 100 watts/cm.$^2$. The nylon was foamed wherever the laser beam irradiated the filament, forming bubbles ranging from 0.05 to 0.30 mm. in diameter. By pulsing the laser beam, discontinuous foam is produced on the nylon filament, forming a nubbly continuous filament that may be woven into nubbly cloth. Indeed, the unfoamed filament of nylon may first be woven into cloth, then steeped in formic acid, and exposed to the radiation from a laser projected in a pattern, as taught herein, to produce a cloth having a foamed design on its surface.

When a nylon sheet (0.50 mm. thick × 1 in. × 2 in.) was substituted for the single filament above, the irradiated portion was foamed in a sharply defined pattern.

There are certain limitations that must be observed when using a laser for the purpose described herein, in addition to the precautions that are normally used to foam the surfaces of plastic articles. Either the plastic or the pneumatogen must absorb the monochromatic laser radiation, or the absorption of radiation must be attained through incorporation of additives that function as energy transfer agents. The intensity of the laser radiation must be sufficiently high to foam the part, but must not be so high as to burn or to char the plastic. The $CO_2$ laser used in these examples had an output that ranged up to 75 watts, and could be focused to produce higher intensities. Although an output of about 5 watts at an exposure time of about 5 seconds produced a foam, higher intensity or longer exposure times are usually required to produce maximum foaming. Higher or lower intensities could be used with proportionally shorter or longer exposure times, provided that the plastic article was not damaged by the laser beam.

A number of variations may be made that are obvious to one skilled in the art. For example, a system of lenses, prisms, reflectors, or scanners, singly or in combination, may be used to direct the radiation from the laser onto the surface of the plastic article.

Additionally, instead of the plastic article that is moved as shown in examples 3 and 4, the laser may be moved mechanically or the beam direction may be changed by optical means to project the radiation on different portions of the surface of the plastic article. Indeed, the output of a laser may be attenuated with the resulting extent of foaming proportionally changed; therefore, an attenuated laser beam, controlled mechanically or optically, may be used to sweep the surface of a plastic article to produce an embossed pattern, or a sculpture in relief, on the plastic surface.

We claim

1. In a method for producing a foamed surface on a thermoplastic article said thermoplastic selected from the group consisting of polystyrene polymer, polyamide polymer, styrene-butadiene-acrylonitrile acrylonitrile graft polymer, vinyl chloride-vinyl acetate copolymer, polyethylene polymer, ethylene-vinyl acetate copolymer and mixtures thereof, including the steps of:

a. steeping the article in a medium absorbable by the thermoplastic article until the medium is partly absorbed into the surface of the article;
   b. removing the article from the medium; and
   c. heating the steeped surface, the improvement in the heating step which comprises projecting the radiation from a $CO_2$ laser having a wavelength of 10.6 microns onto the steeped surface for a sufficient time to result in the formation of a foam.

2. A method of claim 1 wherein the radiation from a laser is projected onto the steeped surface of the article in a predetermined pattern.

3. A method of claim 1 for forming a band of foam on the surface of a polystyrene cup which comprises:

a. steeping the polystyrene cup in a bath of trichloromonofluoromethane at room temperature for about 8 seconds;
   b. removing the cup from the trichloromonofluoromethane bath;
   c. placing the cup at the center of a rotating table so that the cup wall moves at a linear rate in the range of about 50 to 100 mm. per minute;
   d. inserting a mask having a predetermined design between a laser and the cup; and
   e. foaming a band on the cup surface by projecting the radiation from the laser at an output of about 5 watts on the surface of the rotating cup.

* * * * *

UNITED STATES PATENT OFFICE
CERTIFICATE OF CORRECTION

PO-1050
(5/69)

Patent No. 3,627,858          Dated December 14, 1971

Inventor(s) Leo P. Parts, Jules Pinsky and Edgar E. Hardy

It is certified that error appears in the above-identified patent and that said Letters Patent are hereby corrected as shown below:

Column 5, line 15, cancel "acrylonitrile" second occurrence.

Signed and sealed this 26th day of September 1972.

(SEAL)
Attest:

EDWARD M. FLETCHER, JR.
Attesting Officer

ROBERT GOTTSCHALK
Commissioner of Patents